United States Patent
Chu et al.

(10) Patent No.: US 11,757,565 B2
(45) Date of Patent: Sep. 12, 2023

(54) OPERATION OF EMLSR AND EMLMR

(71) Applicant: NXP USA, Inc., Austin, TX (US)

(72) Inventors: Liwen Chu, San Ramon, CA (US);
Young Hoon Kwon, Laguna Niguel, CA (US); Hongyuan Zhang, Fremont, CA (US)

(73) Assignee: NXP USA, Inc., Austin, TX (US)

( * ) Notice: Subject to any disclaimer, the term of this patent is extended or adjusted under 35 U.S.C. 154(b) by 83 days.

(21) Appl. No.: 17/382,598

(22) Filed: Jul. 22, 2021

(65) Prior Publication Data
US 2022/0029736 A1 Jan. 27, 2022

Related U.S. Application Data (60) Provisional application No. 63/137,861, filed on Jan. 15, 2021, provisional application No. 63/107,539, filed on Oct. 30, 2020, provisional application No. 63/072,019, filed on Aug. 28, 2020, provisional application No. 63/055,277, filed on Jul. 22, 2020, provisional application No. 63/055,273, filed on Jul. 22, 2020.

(51) Int. Cl.
*H04L 1/00* (2006.01)
*H04W 8/24* (2009.01)

(52) U.S. Cl.
CPC .......... *H04L 1/0025* (2013.01); *H04L 1/0003* (2013.01); *H04W 8/24* (2013.01)

(58) Field of Classification Search
CPC ... H04L 1/0023; H04L 1/0025; H04L 1/0003; H04W 8/24; H04W 84/12; H04B 7/0413
See application file for complete search history.

(56) References Cited

U.S. PATENT DOCUMENTS

| | | | |
|---|---|---|---|
| 2020/0221545 A1* | 7/2020 | Stacey | H04W 48/16 |
| 2020/0351988 A1* | 11/2020 | Chen | H04W 72/0453 |
| 2020/0413291 A1* | 12/2020 | Chu | H04W 76/15 |
| 2021/0007168 A1* | 1/2021 | Asterjadhi | H04B 7/0413 |

(Continued)

OTHER PUBLICATIONS

Park, Minyoung et al; Intel Corp; Enhanced Multi-Link Single Radio Operation—doc.: 802.11-20/0562r0; retreived from the internet https://mentor.ieee.org/802.11/dcn/20/11-20-0562-00-00be-enhanced-multi-link-single-radio-operation.pptx ; 12 pages (Apr. 2020).

(Continued)

*Primary Examiner* — Congvan Tran (57) ABSTRACT

Various embodiments relate to a method of multi-link operation between two multi-link devices (MLDs) where at least one MLD is a non-simultaneous transmit receive (NSTR) MLD that supports enhanced multi-link radio operation, including: operating, by the NSTR MLD, in a first operating mode, wherein the first operating mode is one of multi-link radio mode or enhanced multi-link radio mode; switching, by the NSTR MLD, between the first operating mode and a second operating mode, wherein the second operating mode is the multi-link radio mode when the first operating mode is the enhanced multi-link radio mode and the second operating mode is the enhanced multi-link radio mode when the first operating mode is the multi-link radio mode; announcing the operation capability by the NSTR MLD; and announcing the operating parameters by the NSTR MLD.

36 Claims, 1 Drawing Sheet

(56) References Cited

U.S. PATENT DOCUMENTS

2021/0014911 A1* 1/2021 Patil .................. H04W 72/0446
2022/0167444 A1* 5/2022 Jang ..................... H04W 76/15

OTHER PUBLICATIONS

Everything RF; "What is Multi-Link Operation (MLO) in Wi-Fi 7?"; Retrieved from internet https://www.everythingrf.com/community/what-is-multi-link-operation-mlo-in-wi-fi-7 on Mar. 14, 2023; 5 pages.
MediaTek Inc.; "Wi-Fi 7 Multi-Link Operation (MLO)" White Paper; Retrieved from internet https://d86o2zu8ugzlg.cloudfront.net/mediatek-craft/documents/Wi-Fi-7-MLO-White-Paper-WF7MLOWP0622.pdf on Mar. 14, 2023 ; 15 pages.

* cited by examiner

OPERATION OF EMLSR AND EMLMR

CROSS-REFERENCE TO RELATED APPLICATIONS

This application claims benefit to U.S. Provisional Patent Application Nos. 63/055,273 filed on Jun. 22, 2020, 63/055,277 filed on Jun. 22, 2020, 63/072,019 filed on Aug. 28, 2020, 63/107,539 filed on Oct. 30, 2020, and 63/137,861 filed on Jan. 15, 2021, the contents of each which are hereby incorporated by reference for all purposes as if fully set forth herein.

TECHNICAL FIELD

Various exemplary embodiments disclosed herein relate generally to apparatus and methods for the operation of enhanced multi-link single radio (eMLSR) and enhanced multi-link multi radio (eMLMR).

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method of multi-link operation between two multi-link devices (MLDs) where at least one MLD is a non-simultaneous transmit receive (NSTR) MLD that supports enhanced multi-link radio operation, including: operating, by the NSTR MLD, in a first operating mode, wherein the first operating mode is one of multi-link radio mode or enhanced multi-link radio mode; switching, by the NSTR MLD, between the first operating mode and a second operating mode, wherein the second operating mode is the multi-link radio mode when the first operating mode is the enhanced multi-link radio mode and the second operating mode is the enhanced multi-link radio mode when the first operating mode is the multi-link radio mode; announcing the operation capability by the NSTR MLD; and announcing the operating parameters by the NSTR MLD.

Various embodiments are described, wherein switching between the first operating mode and a second operating mode includes exchanging a mode switch request action frame and as mode switch response action frame, where the new mode is indicated in an element of the frame.

Various embodiments are described, wherein switching between the first operating mode and a second operating mode includes transmitting a notification frame indicating a mode switch.

Various embodiments are described, wherein announcing the operation capability includes explicitly announcing a Tx/Rx spatial multiplexing capability in each link, when NSTR MLD is in an enhanced multilink multi-radio mode.

Various embodiments are described, wherein an announced Tx/Rx number of spatial streams (Nss), modulation and coding scheme (MCS) set have the Extremely High Throughput (EHT) Nss and MCS format.

Various embodiments are described, wherein announcing the operation capability includes announcing that a Tx/Rx spatial multiplexing capability is the same in each link, when NSTR MLD is in an enhanced multilink single-radio mode.

Various embodiments are described, wherein an announced Tx/Rx number of spatial streams (Nss), modulation and coding scheme (MCS) set have the Extremely High Throughput (EHT) Nss and MCS format.

Various embodiments are described, wherein announcing the operation capability includes explicitly announcing a Tx/Rx spatial multiplexing capability in each link.

Various embodiments are described, wherein an announced Tx/Rx number of spatial streams (Nss), modulation and coding scheme (MCS) set have the Extremely High Throughput (EHT) Nss and MCS format.

Various embodiments are described, wherein announcing the operation capability includes announcing that a Tx/Rx spatial multiplexing capability of the enhanced multi-link radio mode is proportional to a Tx/Rx spatial multiplexing capability of the multi-link radio mode.

Various embodiments are described, wherein announcing the operating parameters includes using number of spatial streams (Nss), modulation and coding scheme (MCS), and bandwidth (BW) capabilities of the enhanced multi-link radio mode when switching from the enhanced multi-link radio mode to the multi-link radio mode.

Various embodiments are described, wherein announcing the operating parameters includes using announced number of spatial streams (Nss), modulation and coding scheme (MCS), and bandwidth (BW) capabilities of the multi-link radio mode of each link when switching from the multi-link radio mode to the enhanced multi-link radio mode.

Various embodiments are described, wherein a mode switch request action frame includes one bit to indicate the switch between the first operating mode and the second operating mode.

Various embodiments are described, wherein a mode switch request action frame includes number of spatial stream values to indicate the switch between the first operating mode and the second operating mode.

Various embodiments are described, further including updating operating parameters in enhanced multi-link radio mode by using the Extremely High Throughput (EHT) and high efficiency (HE) operation mode (OM) control in the HE Control and Operation Mode Notification.

Various embodiments are described, wherein a Tx number of spatial streams (Nss) and Rx Nss at various bandwidths (BW) and modulation and coding scheme (MCS) combinations are derived proportionally to the capabilities of an enhanced multi-link multi-radio mode.

Various embodiments are described, wherein a Tx number of spatial streams (Nss) and Rx Nss at various bandwidths (BW) and modulation and coding scheme (MCS) combinations is the maximal Tx Nss and maximal Rx Nss of the enhanced multi-link single radio mode in the link where the mode changes is transmitted.

Various embodiments are described, wherein the updated parameters other than Tx number of spatial streams (Nss) and Rx Nss are the parameters of the link where the HE Control and Operation Mode Notification is transmitted.

Further various embodiments relate to a non-simultaneous transmit receive (NSTR) multi-link device MLD, including: a transmitter; a receiver; a processor connected to the transmitter and the receiver configured to: operate, by the NSTR MLD, in a first operating mode, wherein the first operating mode is one of multi-link radio mode or enhanced multi-link radio mode; switch, by the NSTR MLD, between the first operating mode and a second operating mode, wherein the second operating mode is the multi-link radio mode when the first operating mode is the enhanced multi-link radio mode and the second operating mode is the enhanced multi-link radio mode when the first operating mode is the multi-link radio mode; announce the operation capability by the NSTR MLD; and announce the operating parameters by the NSTR MLD.

Various embodiments are described, wherein switching between the first operating mode and a second operating mode includes exchanging a mode switch request action frame and as mode switch response action frame.

Various embodiments are described, wherein switching between the first operating mode and a second operating mode includes transmitting a notification frame indicating a mode switch.

Various embodiments are described, wherein announcing the operation capability includes explicitly announcing a Tx/Rx spatial multiplexing capability in each link, when NSTR MLD is in an enhanced multilink multi-radio mode.

The NSTR MLD of claim 22, wherein an announced Tx/Rx number of spatial streams (Nss), modulation and coding scheme (MCS) set have the Extremely High Throughput (EHT) Nss and MCS format.

Various embodiments are described, wherein announcing the operation capability includes announcing that a Tx/Rx spatial multiplexing capability is the same in each link, when NSTR MLD is in an enhanced multilink single-radio mode.

The NSTR MLD of claim 24, wherein an announced Tx/Rx number of spatial streams (Nss), modulation and coding scheme (MCS) set have the Extremely High Throughput (EHT) Nss and MCS format.

Various embodiments are described, wherein announcing the operation capability includes explicitly announcing a Tx/Rx spatial multiplexing capability in each link.

Various embodiments are described, wherein an announced Tx/Rx number of spatial streams (Nss), modulation and coding scheme (MCS) set have the Extremely High Throughput (EHT) Nss and MCS format.

Various embodiments are described, wherein announcing the operation capability includes announcing that a Tx/Rx spatial multiplexing capability of the enhanced multi-link radio mode is proportional to a Tx/Rx spatial multiplexing capability of the multi-link radio mode.

Various embodiments are described, wherein announcing the operating parameters includes using number of spatial streams (Nss), modulation and coding scheme (MCS), and bandwidth (BW) capabilities of the enhanced multi-link radio mode when switching from the enhanced multi-link radio mode to the multi-link radio mode.

Various embodiments are described, wherein announcing the operating parameters includes using announced number of spatial streams (Nss), modulation and coding scheme (MCS), and bandwidth (BW) capabilities of the multi-link radio mode of each link when switching from the multi-link radio mode to the enhanced multi-link radio mode.

Various embodiments are described, wherein a mode switch request action frame includes one bit to indicate the switch between the first operating mode and the second operating mode.

Various embodiments are described, wherein a mode switch request action frame includes number of spatial stream values to indicate the switch between the first operating mode and the second operating mode.

Various embodiments are described, wherein the processor is further configured to update operating parameters in enhanced multi-link radio mode by using the Extremely High Throughput (EHT) and high efficiency (HE) operation mode (OM) control in the HE Control and Operation Mode Notification.

Various embodiments are described, wherein a Tx number of spatial streams (Nss) and Rx Nss at various bandwidths (BW) and modulation and coding scheme (MCS) combinations are derived proportionally to the capabilities of an enhanced multi-link multi-radio mode.

Various embodiments are described, wherein a Tx number of spatial streams (Nss) and Rx Nss at various bandwidths (BW) and modulation and coding scheme (MCS) combinations is the maximal Tx Nss and maximal Rx Nss of the enhanced multi-link single radio mode in the link where the mode changes is transmitted.

Various embodiments are described, wherein the updated parameters other than Tx number of spatial streams (Nss) and Rx Nss are the parameters of the link where the HE Control and Operation Mode Notification is transmitted.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Figure 1:
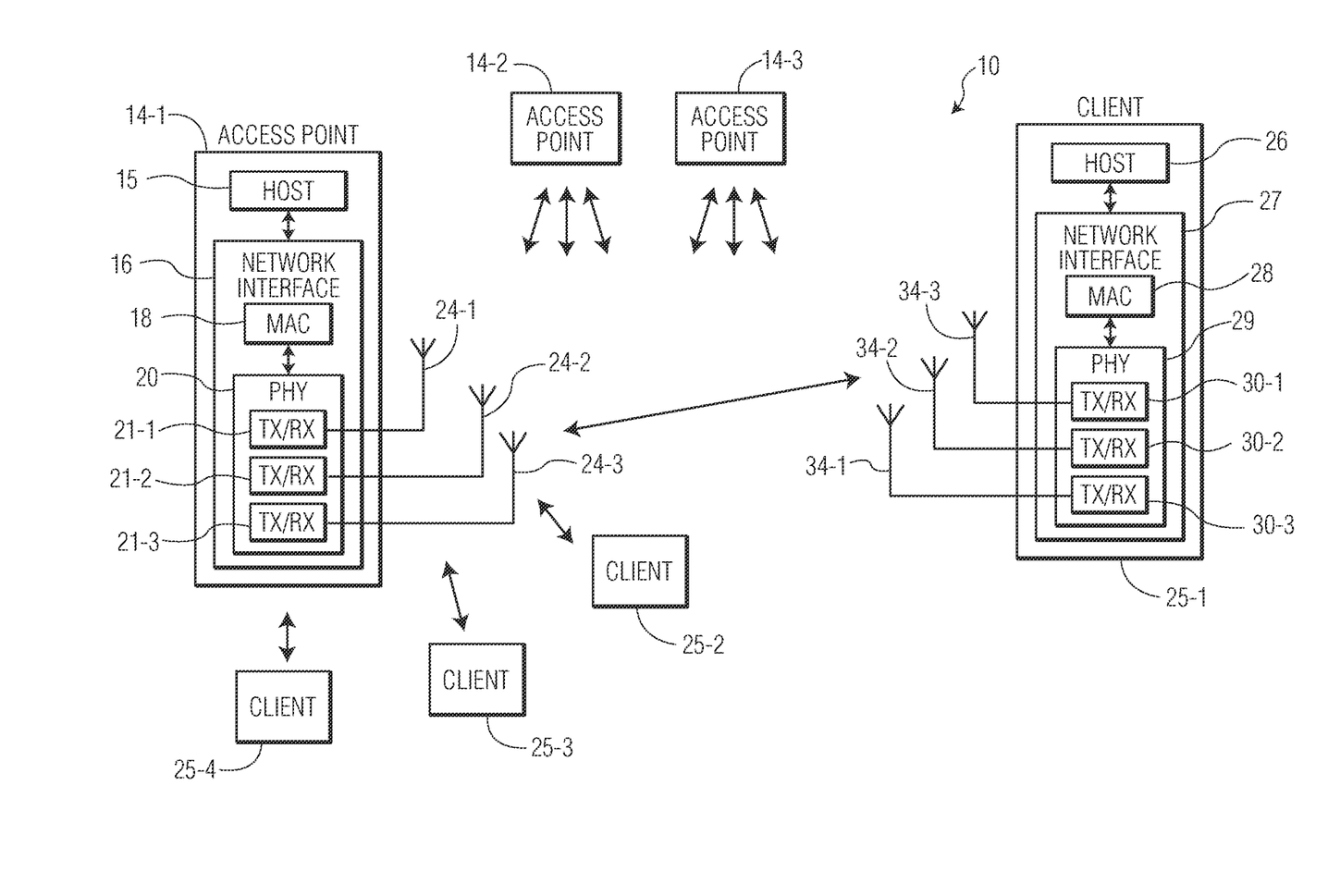
FIG. 1 is a block diagram of an example wireless local area network (WLAN), according to an embodiment.

FIG. 1 is a block diagram of an example wireless local area network (WLAN) 10, according to an embodiment. Such a WLAN 10 may need to be able to update operating parameters across a range of different versions of Wi-Fi or IEEE 802.11. An access point (AP) 14-1 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 may include different numbers (e.g., 1, 2, 4, 5, etc.) of transceivers 21 and antennas 24 in other embodiments. The WLAN 10 may include multiple APs 14-1, 14-2, 14-3 as shown, but any number of APs 14 may be included in WLAN 10.

The WLAN 10 includes a plurality of client stations (STA) 25. Although four client stations 25 are illustrated in FIG. 1, the WLAN 10 may include different numbers (e.g., 1, 2, 3, 5, 6, etc.) of client stations 25 in various scenarios and embodiments. The WLAN 10 may also include AP multi-link device (MLD) where one AP MLD includes multiple affiliated APs and client STA multi-link devices (MLD) where one non-AP MLD includes multiple affiliated STAs. Two or more of the STAs of an non-AP MLD 25 are configured to receive corresponding data streams that are transmitted simultaneously by the AP 14. Additionally, two or more of the STAs of an non-AP MLD 25 are configured to transmit corresponding data streams to one AP MLD 14 such that the AP MLD 14 simultaneously receives the data streams. Also, the client station MLD 25 are configured to receive data streams that are transmitted simultaneously by multiple APs of one AP MLD 14. Likewise, the STAs of an non-AP MLD 25 may transmit data streams simultaneously to the multiple APs of an AP MLD 14.

A client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 may include different numbers (e.g., 1, 2, 4, 5, etc.) of transceivers 30 and antennas 34 in other embodiments.

In an embodiment, one or more of the client stations 25-2, 25-3, and 25-4 has a structure the same as or similar to the client station 25-1. In these embodiments, the client stations 25 structured like the client station 25-1 have the same or a different number of transceivers and antennas. For example, the client station 25-2 has only two transceivers and two antennas (not shown), according to an embodiment.

In an embodiment, the APs 14 and the client stations 25 contend for communication medium using carrier sense multiple access with collision avoidance (CSMA/CA) protocol or another suitable medium access protocol. Further, in an embodiment, the APs 14 or a client station 25 dynamically selects a bandwidth for a transmission based on channels available for the transmission.

In an embodiment, the APs 14 are configured to simultaneously transmit different orthogonal frequency division multiplexing (OFDM) units to different client stations 25 by forming an OFDM access (OFDMA) data unit that includes the different OFDM data units modulated in respective sub-channel blocks of the OFDMA data unit. In an embodiment, the AP 14 allocates different sub-channels to different client stations and forms the OFDMA data unit that includes OFDM data units directed to by modulating the different client stations in sub-channel blocks corresponding to the sub-channels assigned to the client stations.

In an embodiment, the APs 14 are configured to simultaneously transmit different OFDM units to different client stations 25 by transmitting the different OFDM data units via different space time streams of a MU-MIMO communication channel. In an embodiment, the APs 14 allocates different sub-channels (i.e., space time streams) to different client stations and forms the OFDM data units and modulates the different OFDM data units to the space time streams corresponding to the sub-channels assigned to the client stations.

Various iterations of the 802.11 specification are referred to herein. IEEE 802.11ac is referred to as very high throughput (VHT). IEEE 802.11ax is referred to as high efficiency (HE). IEEE 802.11be is referred to as extreme high throughput (EHT). The terms VHT, HE, and EHT will be used in the descriptions found herein.

As described above a multi-link AP MLD has multiple links where each link has one AP affiliated with the AP MLD. This may be accomplished by having two different radios.

A multi-link non-AP MLD has one or multiple links where each link has one STA associated with one AP affiliated with the AP MLD. One way to implement the multi-link non-AP MLD is using two or more radios, where each radio is associated with a specific link. Another way to implement the multi-link non-AP MLD is using a single radio in multiple different bands, for example 5 GHz and 6 GHz. Each band may be associated with a specific link. In this case only one link is available at a time. In yet another implementation, an enhanced multi-link single-radio (EMLSR) non-AP MLD may be used. The EMLSR non-AP MLD uses two radios in different bands to implement the STA. For example, on radio may be a lower cost radio with lesser capabilities and the other radio may be a fully functional radio supporting the latest protocols working in multiple links (monitor the links). The full functional radio switches to the link for the frame exchanges in the remaining TXOP where the soliciting frame in non-HT duplicate PPDU only is received from the peer MLD (e.g., AP MLD). In another embodiment, an enhanced multi-link multi-radio (EMLMR) non-AP MLD may be used. The EMLMR non-AP MLD uses multiple full functional radios to monitor the medium in multiple links. If one soliciting frame in any PPDU (non-HT duplicate PPDU, EHT PPTU etc.) is received from its peer MLD (e.g., AP MLD), the EMLMR non-AP MLD switch its radio in another link to the link so that more Nss than the Nss for link monitoring can be used for the frame exchanges in the link in the remaining time of the TXOP. Each radio may have its own backoff procedures, and when the backoff counter for one of the radios becomes zero that radio and link may be used for transmission where the transmission may require the radio switch from the other link to the link whose backoff counter becomes 0. For example, if an AP of the AP MLD wants to do the frame exchanges with an EMLSR non-AP MLD in AP's working link, it may send a control frame that is long enough for the EMLSR non-AP MLD to switch its full functional radio to AP's working link, that may then transmit data frames to the non-AP MLD in the AP's working link or trigger the non-AP MLD (the STA of the non-AP MLD in the AP's working link) to transmit up link data frames in AP's working link. In one implementation, one non-AP EMLMR MLD has multiple full functional radios in multiple links to monitor the links. When its associated AP MLD in one link (through the AP affiliated with the AP MLD in the link) transmits initial frame in the link, the EMLMR non-AP MLD switches its radios from the other links to the one link so that in the remaining time of the TXOP, a greater number of spatial streams (Nss) can be used. The EMLMR non-AP MLD can have separate backoff procedure in each link. When one link's backoff counter becomes 0, the non-AP MLD switch its radio in other links to the link whose backoff counter becomes 0 to transmit the up link data frames in the link by using a greater number of spatial streams (Nss). An EMLSR non-AP MLD can also work in MLSR mode through mode switch. An EMMSR non-AP MLD can also work in MLMR mode through mode switch. In one embodiment, an AP MLD can be eMLSR/eMLMR AP MLD, e.g., both AP MLD and its associated non-AP MLD are eMLSR/eMLMR MLD. In another embodiment, the peer-to-peer non-AP MLDs or peer-to-peer AP can be eMLSR/eMLMR MLDs. Before the frame exchanges in a link, the initiating MLD sends initial frame in a TXOP to solicit its peer MLD to switch radio.

After the radio switch, the full capability can be used for the frames exchanges in the remaining time of the TXOP.

How to change modes in eMLSR and eMLMR will be described. The term multi-link radio is intended to encompass both MLSRs and MLMRs. The term enhanced multi-link radio is intended to encompass both eMLSRs and eMLMRs. An eMLSR MLD (MLD in eMLSR mode) may monitor the medium in multiple links while receiving/transmitting data/management frames in one of them by using full capability after a radio switch including fully functional modulation and coding scheme (MCS) and Nss values. The initiating control frame is carried in non-HT (duplicate) PPDU. After the initiating frame exchange, the full capability may be used to exchange any PPDU format. For example, which band and radio that may be used may be limited depending upon the power save mode on the different links and bands. The eMLSR MLD may also be in MLSR mode.

An eMLMR MLD (MLD in eMLMR mode) may monitor the medium in multiple links while receiving/transmitting data/management frames in one of them by using full capability after radio switch including fully functional MCS and Nss values. The initiating frame is in non-HT duplicate PPDU or other PPDU with less Nss. After the initiating frame exchange, the full capability may be used to exchange any PPDU format. The eMLMR MLD can also be in MLMR mode.

There are different options for a mode switch between EMLSR/EMLMR and MLSR/MLMR respectively. In a first option, two new frames are introduced: a Mode Switch Request action frame and a Mode Switch Response action frame. The devices contemplating a mode switch may uses these two new frames to negotiate a mode switch. The exchange of Mode Switch Request action frame and Mode Switch Response action frame is used for the switch between eMLSR mode and MLSR mode for an eMLSR capable MLD. Likewise, the exchange of Mode Switch Request action frame and Mode Switch Response action frame is used for the switch between eMLMR mode and MLMR mode for an eMLMR capable MLD. The time when the mode change occurs may be based upon the receive time of response frame. In another embodiment, the action frame may carry the time synchronization function (TSF) time indicating when the new mode will be used. In one embodiment, the mode switch is initiated by non-AP MLD. In another embodiment, the mode switch is initiated by AP MLD. In one embodiment, after a MLD switches to eMLSR mode, all the STAs (APs) related to eMLSR operation in the MLD are in active mode. In one embodiment, after a MLD switches to eMLMR mode, all the STAs (APs) related to eMLMR operation in the MLD are in active mode.

In a second option, a notification frame is used for the mode switch.

Next, how the capabilities of eMLSR and eMLMR are changed will be described. Such capabilities may include Tx/Rx Nss, BW, MCS, etc. For example, an non-AP MLD may announce specific Tx/Rx Nss and MCS values for different bandwidth, say 80 MHz, 160 MHz, and 320 MHz in eMLSR/eMLMR mode. In various situations the same or different values may be announced for each of the different bandwidths. There are three potential options for announcing the capabilities of eMLSR and eMLMR.

In a first options an eMLSR/eMLMR non-AP MLD or eMLMR AP MLD announces its Tx/Rx spatial multiplexing capability explicitly. The Tx/Rx Nss, MCS set of the eMLMR mode (i.e., the Tx/Rx Nss MCS capability of eMLMR mode) has the same format as the EHT MCS Nss support of the STA/AP. An eMLSR non-AP MLD or eMLSR AP MLD has the same Tx/Rx spatial multiplexing capability (Tx/Rx Nss, Mcs capability of various BWs) in each link as the same MLD in MLSR mode. In one embodiment, in an eMLSR MLD, the Tx Nss, Mcs capability of each BW (i.e., Tx Nss, MCS capability of each BW in eMLSR mode of the MLD) in different links can be different, and the Tx/Rx Nss, Mcs capability of each BW (i.e., Rx Nss, MCS capability of each BW in eMLSR mode of the MLD) in different links can be different. In one embodiment, the Tx/Rx Nss, MCS capability of the eMLMR mode uses the EHT MCS Nss capability of each link. The Tx/Rx Nss, MCS set of eMLSR mode in each link has same format as the EHT MCS Nss support of a STA/AP. In one embodiment, in an eMLMR MLD, the Tx Nss, Mcs capability of each BW (i.e., Tx Nss, MCS capability of each BW in eMLMR mode of the MLD) in different links can be different, and the Tx/Rx Nss, Mcs capability of each BW in different links can be different. In one embodiment, in an MLD, the Tx Nss, Mcs capability of each BW in each link in eMLMR mode can be different from the Tx Nss, Mcs capability of each BW in the link in the MLMR mode, and the Rx Nss, Mcs capability of each BW in each link in eMLMR mode can be different from the Rx Nss, Mcs capability of each BW in the link in the MLMR mode. In one embodiment, in eMLSR/eMLMR mode, the announced Nss for various BW, MCS is applied to EHT PPDU. For HE PPDU, the Nss for a BW allowed by HE PPDU is the smaller value of maximal Nss allowed by the 11ax specification and the announced Nss at the BW.

In a second option, an eMLSR/eMLMR non-AP MLD or eMLSR/eMLMR AP MLD announces its Tx/Rx spatial multiplexing capability explicitly. The announced Tx/Rx Nss, MCS capability for various BW is applied to all the links of the MLD in eMLSR/eMLMR mode, i.e., the Tx Nss, Mcs capability of each BW in different links are same, and the Rx Nss, Mcs capability of each BW in different links are same. The Tx/Rx Nss, MCS set of the eMLSR/eMLMR mode has same format as the EHT MCS Nss support of STA/AP (i.e., they support EHT MCS and Nss). In one embodiment, the Tx/Rx Nss, MCS set of the eMLMR mode is announced in the Common Info of Multi-Link element. In one embodiment, the Tx/Rx Nss, MCS capability of the eMLMR mode uses the EHT MCS Nss capability of each link. In one embodiment, in eMLSR/eMLMR mode, the announced Nss for various BW, MCS is applied to EHT PPDU. For HE PPDU, the Nss for a BW allowed by HE PPDU is the smaller value of maximal Nss allowed by 11ax spec and the announced Nss at the BW.

In a third option, an eMLSR/eMLMR non-AP MLD or eMLSR/eMLMR AP MLD has a Maximal Tx/Rx Nss when <=80 MHz. These Nss values may then be used to calculate the Nss values for specific bandwidths BW using proportional rules. For the specific BW (one of 80, 160, and 320) and specific MCS (one of 9, 11, and 13), the maximal Tx Nss in a link is equal to floor(MaxTxNssNTBW MCS*MaxTxNssEM/MaxTxNssNT80, where MaxTxNssSM is the maximal Tx Nss at 80 MHz in eMLSR/eMLMR mode, MaxTxNssNT80 is the maximal normal Tx Nss at 80 MHz in MLSR/MLMR mode in the link, and MaxTxNss NTBWMCS is the maximal normal Tx Nss at MCS and BW in MLSR/MLMR mode in the link. For the specific BW (one of 80, 160, and 320) and specific MCS (one of 9, 11, and 13), the maximal Rx Nss in a link is equal to floor (MaxRxNssNTBWMCS*MaxRxNssEM/MaxTxNssNT-80), where MaxRxNssSM is the maximal Rx Nss at 80 MHz in eMLSR/eMLMR mode in the link, MaxRxNssNT80 is the maximal normal Rx Nss at 80 MHz in MLSR/MLMR mode, and MaxRxNssNTBWMCS is the maximal normal Rx Nss at MCS and BW in MLSR/MLMR mode in the link. In one embodiment, in eMLSR/eMLMR mode, the calculated Nss for various BW, MCS is applied to EHT PPDU. For HE PPDU, the Nss for a BW allowed by HE PPDU is the smaller value of maximal Nss allowed by 11ax spec and the announced Nss at the BW.

When there is switching between eMLSR/eMLMR and MLSR/MLMR modes, the capabilities in the new node need to be determined. Two options for changing the operating parameters when a mode switch between eMLSR/eMLMR and MLSR/MLMR modes will now be described.

In a first option, after switching to eMLSR/eMLMR mode from MLSR/MLMR mode, the capacities of MCS, Nss, BW in eMLSR/eMLMR are used. After switching to MLSR/MLMR mode from eMLSR/eMLMR mode, the announced capabilities of MCS, Nss, BW in MLSR/MLMR of each link are used.

In a second option, when switching to eMLSR/eMLMR mode, the maximal Tx/Rx Nss at 80 MHz is announced, and the Tx/Rx Nss at BW, MCS combination is derived proportionally based on the capacities of MCS, Nss in eMLSR/eMLMR and the maximal Tx/Rx Nss at 80 MHz. For the specific BW (one of 80, 160, and 320) and specific MCS (one of 9, 11, and 13), the maximal Tx Nss is equal to floor(MaxTxNssEMBWMCS*MaxTxNssEMAnnounce/MaxTxNssEM80, where MaxTxNssEMAnnounce is the announced maximal Tx Nss at 80 MHz in eMLSR/eMLMR mode, MaxTxNssEM80 is the maximal normal Tx Nss at 80 MHz in eMLSR/eMLMR mode, and MaxTxNssEMBWMCS is the maximal normal Tx Nss at MCS and BW in eMLSR/eMLMR mode. For the specific BW (one of 80, 160, and 320) and specific MCS (one of 9, 11, and 13), the maximal Rx Nss is equal to floor(MaxRxNssEMBWMCS*MaxRxNssEMAnnounce/MaxRxNssEM80, where MaxRxNssEMAnnounce is the announced maximal Rx Nss at 80 MHz in eMLSR/eMLMR mode, MaxRxNssEM80 is the maximal normal Rx Nss at 80 MHz in eMLSR/eMLMR mode, and MaxRxNssEMBWMCS is the maximal normal Rx Nss at MCS and BW in eMLSR/eMLMR mode. When switching to MLSR/MLMR mode, the maximal Tx/Rx Nss at 80 MHz is announced, and the Tx/Rx Nss at BW, MCS combination in each link is derived proportionally based on the capacities of MCS, Nss in MLSR/MLMR of the related link and the maximal Tx/Rx Nss at 80 MHz. For the specific BW (one of 80, 160, and 320) and specific MCS (one of 9, 11, and 13), the maximal Tx Nss in link 1 is equal to floor(MaxTxNssBWMCS MaxTxNssAnnounce/MaxTxNss80, where MaxTxNssAnnounce is the announced maximal Tx Nss at 80 MHz in MLSR/MLMR mode in link1, MaxTxNss80 is the maximal normal Tx Nss at 80 MHz in MLSR/MLMR mode in link1, and MaxTxNssBWMCS is the maximal normal Tx Nss at MCS and BW in MLSR/MLMR mode in link1.

Different formats may be used to indicate the operation mode update. In a first option, a new defined element is used to announce the switch between eMLSR/eMLMR mode and MLSR/MLMR respectively. This may include using one bit can be used to indicate the new mode. The one bit may be included in the mode switch request action frame.

In a second option, the Mode Switch Request action frame may also carry the Tx Nss, Rx Nss to indicate a mode change.

In a third options, a new defined HE Control field may be used to announce the switch between eMLSR/eMLMR mode and MLSR/MLMR respectively. One bit can be used to indicate the new mode. Alternatively, the new HE Control filed may carry the Tx Nss, Rx Nss to indicate a mode change.

How the updated operating parameters are determined when in the eMLSR/eMLMR mode will now be described.

In a first option, EHT+HE OM Control in HE Control field and Operation Mode Notification for each STA/AP in MLSR/MLMR is used for EMLSR/EMLMR mode. The Tx Nss and Rx Nss may be updated in two different ways. First, the announced Tx Nss, Rx Nss is the maximal Tx Nss, Rx Nss at 80 MHz of eMLSR/eMLMR mode. The Tx Nss and Rx Nss at various BW+MCS combinations are derived proportionally to the capabilities of eMLSR/eMLMR. For the specific BW (one of 80, 160, and 320) and specific MCS (one of 9, 11, and 13), the maximal Rx Nss is equal to floor(MaxRxNssBWMCSEM*MaxRxNssEMAnnounce/MaxRxNss80EM, where MaxRxNssEMAnnounce is the announced maximal Rx Nss at 80 MHz in eMLSR/eMLMR mode, MaxRxNss80EM is the maximal normal Rx Nss at 80 MHz in eMLSR/eMLMR mode, and MaxTxNss BWMCSEM is the maximal Rx Nss at MCS and BW in eMLSR/eMLMR mode. For the specific BW (one of 80, 160, and 320) and specific MCS (one of 9, 11, and 13), the maximal Tx Nss is equal to floor(MaxTxNss BWMCSEM*MaxTxNssEMAnnounce/MaxTxNss80EM, where MaxTxNssEMAnnounce is the announced maximal Tx Nss at 80 MHz in eMLSR/eMLMR mode, MaxTxNss80EM is the maximal normal Tx Nss at 80 MHz in eMLSR/eMLMR mode, and MaxTxNssBWMCSEM is the maximal Tx Nss at MCS and BW in eMLSR/eMLMR mode.

In a second option, the announced Tx Nss, Rx Nss is the maximal Tx Nss, Rx Nss at 80 MHz of eMLMR mode. The Tx Nss and Rx Nss at various BW+MCS combinations are derived proportionally to the capabilities of eMLMR. For the specific BW (one of 80, 160, and 320) and specific MCS (one of 9, 11, and 13), the maximal Rx Nss is equal to floor(MaxRxNssBWMCSEM*MaxRxNssEMAnnounce/MaxRxNss80EM, where MaxRxNssEMAnnounce is the announced maximal Rx Nss at 80 MHz in eMLMR mode, MaxRxNss80EM is the maximal normal Rx Nss at 80 MHz in eMLMR mode, and MaxTxNssBWMCSEM is the maximal Rx Nss at MCS and BW in eMLMR mode. For the specific BW (one of 80, 160, and 320) and specific MCS (one of 9, 11, and 13), the maximal Tx Nss is equal to floor(MaxTxNssBWMCSEM MaxTxNssEMAnnounce/MaxTxNss80EM, where MaxTxNssEMAnnounce is the announced maximal Tx Nss at 80 MHz in eMLMR mode, MaxTxNss80EM is the maximal normal Tx Nss at 80 MHz in eMLMR mode, and MaxTxNssBWMCSEM is the maximal Tx Nss at MCS and BW in eMLMR mode. The announced Tx Nss, Rx Nss is the maximal Tx Nss, Rx Nss at 80 MHz of eMLSR mode in the link where the mode change is transmitted. For the specific BW (one of 80, 160, and 320) and specific MCS (one of 9, 11, and 13) of a link (any link of eMLSR mode), the maximal Rx Nss in the link is equal to floor(MaxRxNssBWMCSEM MaxRxNssEMAnnounce/MaxRxNss80EM, where MaxRxNssEMAnnounce is the announced maximal Rx Nss at 80 MHz in eMLSR mode in the link, MaxRxNss80EM is the maximal normal Rx Nss at 80 MHz in eMLSR mode in the link, and MaxTxNssBWMCSEM is the maximal Rx Nss at MCS and BW in eMLSR mode in the link. For the specific BW (one of 80, 160, and 320) and specific MCS (one of 9, 11, and 13) in a link, the maximal Tx Nss in the link is equal to floor(MaxTxNssBWMCSEM MaxTxNssEMAnnounce/MaxTxNss80EM, where MaxTxNssEMAnnounce is the announced maximal Tx Nss at 80 MHz in eMLSR mode in the link, MaxTxNss80EM is the maximal normal Tx Nss at 80 MHz in eMLSR mode in the link, and MaxTxNssBWMCSEM is the maximal Tx Nss at MCS and BW in eMLSR mode in the link.

In the third option, For the specific BW (one of 80, 160, and 320) and specific MCS (one of 9, 11, and 13) of a link (any link of eMLSR mode), the maximal Rx Nss of eMLMR in the link is equal to floor (MaxRxNssBWMCSEM*MaxRxNssEMAnnounce/ MaxRxNss80EM, where MaxRxNssEMAnnounce is the announced maximal Rx Nss at 80 MHz in eMLMR mode in the link, MaxRxNss80EM is the maximal normal Rx Nss at 80 MHz in eMLMR mode in the link, and MaxTxNssBWMCSEM is the maximal Rx Nss at MCS and BW in eMLMR mode in the link. For the specific BW (one of 80, 160, and 320) and specific MCS (one of 9, 11, and 13) in a link, the maximal Tx Nss in the link is equal to floor(MaxTxNssBWMCSEM MaxTxNssEMAnnounce/ MaxTxNss80EM, where MaxTxNssEMAnnounce is the announced maximal Tx Nss at 80 MHz in eMLMR mode in the link, MaxTxNss80EM is the maximal normal Tx Nss at 80 MHz in eMLMR mode in the link, and MaxTxNssBWMCSEM is the maximal Tx Nss at MCS and BW in eMLMR mode in the link. The updated eMLSR Nss MCS change is same as eMLSR in option 2

The other operational parameters may be updated in two different ways. First, the announced BW, UL MU Disable, UL MU Data Disable etc. are the parameters of the link where the HE Control is transmitted. That is it only applies to one link. In a second way, the announced BW, UL MU Disable, UL MU Data Disable etc. are applied as the parameters for all of the links in eMLSR/eMLMR mode. If the BW capabilities of different links in eMLSR/eMLMR mode are different and the announced BW is wider than the BW capability of a link, the new BW of the link will be the BW capability of the link.

A second option, for determining updated operation parameters when in the eMLSR/eMLMR mode, includes that the newly defined HE Control field or element is used for announcing the operating mode change in eMLSR/eMLMR mode.

Changes in the power save mode and power save state in the eMLSR/eMLMR mode will now be discussed. Two options will be described.

In a first option, the STAs in different links of the MLD in the eMLSR/eMLMR Mode may be in different power save modes, i.e., Active mode or Power Save mode. The STAs in different links of a MLD in the eMLSR/eMLMR Mode that is in Power Save mode may be in different power save states, i.e., Awake or Doze. The power save mode change and power save state change announced in one link is applied to the link only. One optimization to this may include, when only one link is in Active mode and other links are in Doze state, the special frame exchange initiated by special control frame (e.g., MU-RTS/CTS) for the radio switch in an active link is not needed.

In a second option, all the STAs of the MLD in the eMLSR/eMLMR Mode are in same power save mode. All the STAs of a MLD in the eMLSR/eMLMR Mode that is in Power Save mode are in same power save state.

Further, for the second option, the power save mode change (through power management) and power save state are applied to all the links of eMLSR/eMLMR mode. This may be accomplished using one of the following methods. First, an implicit method may be used. If the power save mode change occurs in one link of eMLSR/eMLMR mode through the announcement in the link of eMLSR/eMLMR mode, the power save mode in other links of eMLSR/ eMLMR mode perform the same change. If the power save state change occurs in one link of eMLSR/eMLMR mode through the announcement in one link of eMLSR/eMLMR mode, the power save state in other links of eMLSR/ eMLMR mode do the same change. Second, an explicit method may be used. The frame that carries power save mode change includes an HE Control field that indicates the links being applied. The frame that carries power save state change includes the HE Control field that indicates the links being applied.

Changes in the target wait time (TWT) in the eMLSR/ eMLMR mode will now be discussed. Two different options will be described. In a first option, the STAs in different links of a MLD in the eMLSR/eMLMR Mode can negotiate the different TWT service periods (SPs). An optimization of this option may include that when all links negotiate the TWT agreements and the TWT SPs in different links do not start at the same time and when only one link has negotiated a TWT SP at the time, the special frame exchange initiated by special control frame (e.g., MU-RTS/CTS) for radio switch in active link is not needed.

In a second option of changing TWT in the eMLSR/ eMLMR mode, all the STAs in different links of MLD under eMLSR/eMLMR Mode negotiate the same TWT SPs. In this situation, an eMLSR non-AP MLD negotiates the TWT SPs with the same start time, interval, TWT SP duration, announced/unannounced mode, and Trigger-enabled mode. Likewise, an eMLSR MLD teardown the TWT agreement applies to all of all links. The TWT Information suspend/ resume/change applies to all of the TWT agreements with same parameters in all links in eMLSR mode.

Methods of TWT Action frames applied to all links related to eMLSR using one of the following four options. In option one, explicit signaling is used. The TWT Action frame indicates whether the TWT agreement for eMLSR mode or not. If the indication indicates the TWT Action is for non-AP MLD in eMLSR mode, the TWT Action frame will be applied to all the links under eMLSR mode of the non-AP MLD.

In option two, implicit signaling is used. If the TWT Action frame for a non-AP MLD is transmitted in a link of the non-AP MLD that is in the eMLSR mode, the TWT Action frame will be applied to all the links under eMLSR mode of the non-AP MLD.

In option three, the TWT Action frame for each link of a non-AP MLD in the eMLSR mode is separately transmitted. The TWT Action frame in separate links establish the same TWT agreements in the eMLSR links, suspend/resume all TWT SPs with same parameters in the eMLSR links, and teardown TWT agreements with the same parameters in the eMLSR links.

In option four, the TWT Action frame may carry a link bitmap in the TWT element or HE Control field that indicates to which links the announced TWT is the applied.

When the TWT SP ends early the following steps may be taken. The end of service period (EOSP) transmitted by an AP of the associated AP MLD in one link related to the eMLSR mode of a non-AP MLD applies to all other links related to the eMLSR mode of the non-AP MLD. This can be accomplished via one of: an explicit link bitmap indication of the related eMLSR links; or an implicit method (based on whether the link of the addressed STA belongs to a non-AP MLD of eMLSR mode). The More Data indication transmitted by an AP of the associated AP MLD in one link related to the eMLSR mode of a non-AP MLD applies to all other links related to the eMLSR mode of the non-AP MLD. This may be accomplished through one of: explicit link bitmap indication of the related eMLSR links; or implicit method (based on whether the link of the addressed STA belongs to a non-AP MLD of eMLSR mode).

These changes in TWT as described for the eMLSR mode may also be applied in the same way to devices in the eMLMR mode.

Changes in the (dynamic) space multiplexing (SM) power save in the eMLSR/eMLMR mode will now be discussed. Two different options will be described. In a first option, the (dynamic) SM power save transmitted by a STA affiliated with non-AP eMLSR MLD is applied to the link where the SM power save Action frame is transmitted. The (dynamic) SM power save transmitted by a STA affiliated with non-AP eMLMR MLD is applied to the link where the SM power save Action frame is transmitted.

In a second options, the (dynamic) SM power save is applied to all the links of eMLSR. The methods for the TWT Action frame may be applied to SM power save Action frame. The (dynamic) SM power save is applied to all the links of eMLMR. The methods for TWT Action frame can be applied to SM power save Action frame.

The system and method described herein may be carried out using specific hardware to perform the actions or software running on a processor may implement the embodiments. The processor may be connected to memory and storage, where the software instructions are stored in the storage. The processor may be any general purpose processor, a graphics processor, a signal processor, or any other type of specialized processor.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and FIGURES are for illustrative purposes only and do not in any way limit the invention, which is defined only by the claims.

What is claimed is:

1. A method of multi-link operation between two multi-link devices (MLDs) where at least one MLD is a non-simultaneous transmit receive (NSTR) MLD that supports enhanced multi-link radio operation, comprising:
    operating, by the NSTR MLD, in a first operating mode, wherein the first operating mode is one of multi-link radio mode or enhanced multi-link radio mode;
    switching, by the NSTR MLD, between the first operating mode and a second operating mode,
    wherein the second operating mode is the multi-link radio mode when the first operating mode is the enhanced multi-link radio mode and the second operating mode is the enhanced multi-link radio mode when the first operating mode is the multi-link radio mode;
    announcing the operation capability by the NSTR MLD based on the switching between the multi-link radio mode and the enhanced multi-link radio mode; and
    announcing the operating parameters by the NSTR MLD based on the switching between the multi-link radio mode and the enhanced multi-link radio mode.

2. The method of claim 1,
wherein switching between the first operating mode and a second operating mode includes exchanging a mode switch request action frame and a mode switch response action frame, where the new mode is indicated in an element of the frame.

3. The method of claim 1,
wherein switching between the first operating mode and the second operating mode includes transmitting a notification frame indicating a mode switch.

4. The method of claim 1,
wherein announcing the operation capability includes explicitly announcing a Tx/Rx spatial multiplexing capability in each link, when NSTR MLD is in an enhanced multilink multi-radio mode.

5. The method of claim 4,
wherein an announced Tx/Rx number of spatial streams (Nss), modulation and coding scheme (MCS) set have the Extremely High Throughput (EHT) Nss and MCS format.

6. The method of claim 1,
wherein announcing the operation capability includes announcing that a Tx/Rx spatial multiplexing capability is the same in each link, when NSTR MLD is in an enhanced multilink single-radio mode.

7. The method of claim 6,
wherein an announced Tx/Rx number of spatial streams (Nss), modulation and coding scheme (MCS) set have the Extremely High Throughput (EHT) Nss and MCS format.

8. The method of claim 1,
wherein announcing the operation capability includes explicitly announcing a Tx/Rx spatial multiplexing capability in each link.

9. The method of claim 8,
wherein an announced Tx/Rx number of spatial streams (Nss), modulation and coding scheme (MCS) set have the Extremely High Throughput (EHT) Nss and MCS format.

10. The method of claim 1,
wherein announcing the operation capability includes announcing that a Tx/Rx spatial multiplexing capability of the enhanced multi-link radio mode is proportional to a Tx/Rx spatial multiplexing capability of the multi-link radio mode.

11. The method of claim 1,
wherein announcing the operating parameters includes using number of spatial streams (Nss), modulation and coding scheme (MCS), and bandwidth (BW) capabilities of the enhanced multi-link radio mode when switching from the enhanced multi-link radio mode to the multi-link radio mode.

12. The method of claim 1,
wherein announcing the operating parameters includes using announced number of spatial streams (Nss), modulation and coding scheme (MCS), and bandwidth (BW) capabilities of the multi-link radio mode of each link when switching from the multi-link radio mode to the enhanced multi-link radio mode.

13. The method of claim 1,
wherein a mode switch request action frame includes one bit to indicate the switch between the first operating mode and the second operating mode.

14. The method of claim 1,
wherein a mode switch request action frame includes number of spatial stream values to indicate the switch between the first operating mode and the second operating mode.

15. The method of claim 1, further comprising
updating operating parameters in enhanced multi-link radio mode by using the Extremely High Throughput (EHT) and high efficiency (HE) operation mode (OM) control in the HE Control and Operation Mode Notification.

16. The method of claim 15,
wherein a Tx number of spatial streams (Nss) and Rx Nss at various bandwidths (BW) and modulation and coding scheme (MCS) combinations are derived proportionally to the capabilities of an enhanced multi-link multi-radio mode.

17. The method of claim 15,
wherein a Tx number of spatial streams (Nss) and Rx Nss at various bandwidths (BW) and modulation and coding scheme (MCS) combinations is the maximal Tx Nss and maximal Rx Nss of the enhanced multi-link radio mode in the link where the mode changes is transmitted.

18. The method of claim 15,
wherein the updated parameters other than Tx number of spatial streams (Nss) and Rx Nss are the parameters of the link where the HE Control and Operation Mode Notification is transmitted.

19. A non-simultaneous transmit receive (NSTR) multi-link device MLD, comprising:
a transmitter;
a receiver;
a processor connected to the transmitter and the receiver configured to:
operate, by the NSTR MLD, in a first operating mode, wherein the first operating mode is one of multi-link radio mode or enhanced multi-link radio mode;
switch, by the NSTR MLD, between the first operating mode and a second operating mode,
wherein the second operating mode is the multi-link radio mode when the first operating mode is the enhanced multi-link radio mode and the second operating mode is the enhanced multi-link radio mode when the first operating mode is the multi-link radio mode;
announce the operation capability by the NSTR MLD; and
announce the operating parameters by the NSTR MLD.

20. The NSTR MLD of claim 19,
wherein switching between the first operating mode and a second operating mode includes exchanging a mode switch request action frame and as mode switch response action frame.

21. The NSTR MLD of claim 19,
wherein switching between the first operating mode and a second operating mode includes transmitting a notification frame indicating a mode switch.

22. The NSTR MLD of claim 19,
wherein announcing the operation capability includes explicitly announcing a Tx/Rx spatial multiplexing capability in each link, when NSTR MLD is in an enhanced multilink multi-radio mode.

23. The NSTR MLD of claim 22,
wherein an announced Tx/Rx number of spatial streams (Nss), modulation and coding scheme (MCS) set have the Extremely High Throughput (EHT) Nss and MCS format.

24. The NSTR MLD of claim 19,
wherein announcing the operation capability includes announcing that a Tx/Rx spatial multiplexing capability is the same in each link, when NSTR MLD is in an enhanced multilink single-radio mode.

25. The NSTR MLD of claim 24,
wherein an announced Tx/Rx number of spatial streams (Nss), modulation and coding scheme (MCS) set have the Extremely High Throughput (EHT) Nss and MCS format.

26. The NSTR MLD of claim 19,
wherein announcing the operation capability includes explicitly announcing a Tx/Rx spatial multiplexing capability in each link.

27. The NSTR MLD of claim 26,
wherein an announced Tx/Rx number of spatial streams (Nss), modulation and coding scheme (MCS) set have the Extremely High Throughput (EHT) Nss and MCS format.

28. The NSTR MLD of claim 19,
wherein announcing the operation capability includes announcing that a Tx/Rx spatial multiplexing capability of the enhanced multi-link radio mode is proportional to a Tx/Rx spatial multiplexing capability of the multi-link radio mode.

29. The NSTR MLD of claim 19,
wherein announcing the operating parameters includes using number of spatial streams (Nss), modulation and coding scheme (MCS), and bandwidth (BW) capabilities of the enhanced multi-link radio mode when switching from the enhanced multi-link radio mode to the multi-link radio mode.

30. The NSTR MLD of claim 19,
wherein announcing the operating parameters includes using announced number of spatial streams (Nss), modulation and coding scheme (MCS), and bandwidth (BW) capabilities of the multi-link radio mode of each link when switching from the multi-link radio mode to the enhanced multi-link radio mode.

31. The NSTR MLD of claim 19,
wherein a mode switch request action frame includes one bit to indicate the switch between the first operating mode and the second operating mode.

32. The NSTR MLD of claim 19,
wherein a mode switch request action frame includes number of spatial stream values to indicate the switch between the first operating mode and the second operating mode.

33. The NSTR MLD of claim 19,
wherein the processor is further configured to update operating parameters in enhanced multi-link radio mode by using the Extremely High Throughput (EHT) and high efficiency (HE) operation mode (OM) control in the HE Control and Operation Mode Notification.

34. The NSTR MLD of claim 33,
wherein a Tx number of spatial streams (Nss) and Rx Nss at various bandwidths (BW) and modulation and coding scheme (MCS) combinations are derived proportionally to the capabilities of an enhanced multi-link multi-radio mode.

35. The NSTR MLD of claim 33,
wherein a Tx number of spatial streams (Nss) and Rx Nss at various bandwidths (BW) and modulation and coding scheme (MCS) combinations is the maximal Tx Nss and maximal Rx Nss of the enhanced multi-link radio mode in the link where the mode changes is transmitted.

36. The NSTR MLD of claim 33, wherein the updated parameters other than Tx number of spatial streams (Nss) and Rx Nss are the parameters of the link where the HE Control and Operation Mode Notification is transmitted.

\* \* \* \* \*